J. GOODRICH.
Nut and Tap Wrench.
No. 210,684. Patented Dec. 10, 1878.
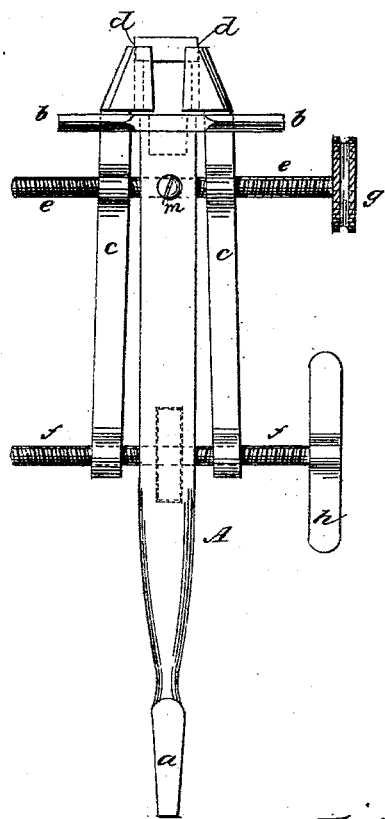
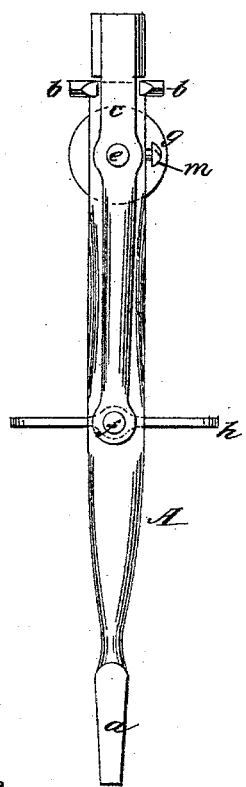
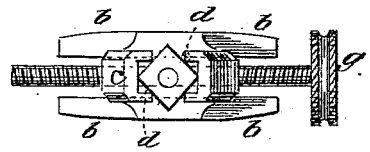
WITNESSES:
INVENTOR:

UNITED STATES PATENT OFFICE.

JOSEPH GOODRICH, OF HENRY, ASSIGNOR OF ONE-FOURTH HIS RIGHT TO JAMES B. WALLER, OF COOK COUNTY, ILLINOIS.

IMPROVEMENT IN NUT AND TAP WRENCHES.

Specification forming part of Letters Patent No. 210,684, dated December 10, 1878; application filed April 2, 1878.

*To all whom it may concern:*

Be it known that I, JOSEPH GOODRICH, of Henry, in the county of Marshall and State of Illinois, have invented a certain new and Improved Wrench and Vise, of which the following is a specification:

The object of my invention is to provide a convenient wrench and vise for grasping and holding nuts and other articles, which may be used in a bit-brace, or in connection with an ordinary tap-wrench, or in a lathe or tapping-machine for holding work to be operated upon, or which may be attached to a bench and used as a stationary vise.

The invention consists, essentially, in a shank having two jaws, one upon either side, which are moved by right-and-left-hand screws, so as to open and close simultaneously.

In the drawings, Figure 1 is a side elevation of my improved wrench and vise. Fig. 2 is a front elevation. Fig. 3 is an end view.

A is a shank, which may have a squared and tapered end, $a$, adapted to fit a bit-brace or ordinary tap-wrench. From opposite sides of the shank A arms $b$ project at right angles to the shank, two of the said arms being on each side of the shank.

Between the arms $b$, on opposite sides of the shank, are placed jaws $c$, which are similar to ordinary vise-jaws, and are guided by the arms $b$. A slot, $d$, may be formed in the face of each jaw for receiving the corners of a nut.

The jaws are substantially parallel with the shank A, and two screws, $e\,f$, pass through the jaws and the shank. These screws have upon one side of the shank a right-hand and upon the other side a left-hand thread, which engage corresponding internal threads in the jaws $c$. Each screw $e\,f$, where it passes through the shank A, is plain or cylindrical, and to prevent it from moving endwise it is provided with a circumferential groove, which is engaged by a screw or stop, $m$, inserted through the side of the shank.

The screw $e$ is shown as provided with a milled head, $g$, and the screw $f$ with a thumb-piece or T-head, $h$, for convenience in turning; or, as a substitute for this construction, a milled wheel may, if desired, be secured to the center of each screw, and placed in a mortise formed in the middle of the shank A, as indicated by dotted lines in Fig. 1. In this arrangement the screws or stops $m$ may be dispensed with.

The jaws are adjusted to different objects and kept parallel with each other by turning both of the screws $e\,f$, and they are tightened by first screwing up the screw $e$, and afterward spreading the posterior ends of the jaws by means of the screw $f$. The jaws are thus employed as levers to multiply the pressure of the screw $f$, the screw $e$ being used as a fulcrum.

I claim as my invention—

1. The combination of the shank A, movable jaws $c\,c$, and right-and-left-hand screws $e\,f$, working independently of each other, substantially as set forth.

2. The combination of guides $b\,b$ with the shank A, for supporting the jaws $c$, substantially as herein set forth.

JOSEPH GOODRICH.

Witnesses:
 W. GALLAHER,
 C. C. JONES.